US009103973B2

(12) United States Patent
Fattal et al.

(10) Patent No.: US 9,103,973 B2
(45) Date of Patent: Aug. 11, 2015

(54) SUB-WAVELENGTH GRATING-BASED OPTICAL ELEMENTS

(75) Inventors: David A. Fattal, Mountain View, CA (US); Marco Fiorentino, Mountain View, CA (US); Raymond G. Beausoleil, Redmond, WA (US); Jingjing Li, Sunnyvale, CA (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 0 days.

(21) Appl. No.: 14/009,775

(22) PCT Filed: Apr. 20, 2011

(86) PCT No.: PCT/US2011/033295
§ 371 (c)(1),
(2), (4) Date: Oct. 3, 2013

(87) PCT Pub. No.: WO2012/144997
PCT Pub. Date: Oct. 26, 2012

(65) Prior Publication Data
US 2014/0044392 A1 Feb. 13, 2014

(51) Int. Cl.
*G02B 6/12* (2006.01)
*G02B 6/34* (2006.01)
*G02B 5/18* (2006.01)
*G02B 6/42* (2006.01)
*G02B 6/43* (2006.01)

(52) U.S. Cl.
CPC .......... *G02B 6/12002* (2013.01); *G02B 5/1809* (2013.01); *G02B 6/34* (2013.01); *G02B 6/4214* (2013.01); *G02B 6/43* (2013.01)

(58) Field of Classification Search
CPC ................................ G02B 6/34; G02B 6/1809
See application file for complete search history.

(56) References Cited

U.S. PATENT DOCUMENTS

| 5,604,345 | A | 2/1997 | Matsuura |
| 6,545,808 | B1 | 4/2003 | Ehbets et al. |
| 7,408,601 | B1 | 8/2008 | Huang et al. |
| 7,474,396 | B2 * | 1/2009 | Wu et al. ....................... 356/301 |

(Continued)

FOREIGN PATENT DOCUMENTS

| JP | 2008216602 | 9/2008 |
| JP | 2010-079041 A | 4/2010 |

(Continued)

OTHER PUBLICATIONS

Dickensheets, D. L. et al., 2008 IEEE/LEOS International Conference on Optical MEMS and Nanophotonics, Aug. 11, 2008, pp. 54-55.

(Continued)

*Primary Examiner* — Omar R Rojas
(74) *Attorney, Agent, or Firm* — Hewlett-Packard Patent Department

(57) ABSTRACT

Planar, polarization insensitive, optical elements to control refraction of transmitted light in free space are disclosed. In one aspect, an optical element includes a substrate having a planar surface, and a polarization insensitive, high contrast, sub-wavelength grating composed of posts that extend from the planar surface. The grating has at least one region. Within each region, cross-sectional dimensions of the posts and/or lattice arrangement of the posts are nonperiodically varied to control refraction of light transmitted through the optical element.

14 Claims, 14 Drawing Sheets

(56) References Cited

U.S. PATENT DOCUMENTS

| | | | |
|---|---|---|---|
| 7,526,159 | B2 | 4/2009 | Haney et al. |
| 8,781,276 | B2 * | 7/2014 | Fattal et al. ............... 385/49 |
| 2004/0114642 | A1 | 6/2004 | Bullington et al. |
| 2007/0200946 | A1 | 8/2007 | Onozawa et al. |
| 2007/0206287 | A1 * | 9/2007 | Tsukamoto ............... 359/599 |
| 2007/0284510 | A1 | 12/2007 | Li et al. |
| 2008/0137161 | A1 | 6/2008 | Roichman et al. |
| 2009/0020690 | A1 | 1/2009 | Toda |
| 2009/0290836 | A1 | 11/2009 | Lee et al. |
| 2010/0126577 | A1 | 5/2010 | Wu et al. |
| 2011/0083739 | A1 | 4/2011 | Peng et al. |
| 2012/0194912 | A1 * | 8/2012 | Faraon et al. ............ 359/573 |

FOREIGN PATENT DOCUMENTS

| | | | |
|---|---|---|---|
| JP | 2010-212625 | A | 9/2010 |
| JP | 2010212625 | A * | 9/2010 |
| KR | 10-0803288 | B1 | 2/2008 |
| TW | 201140141 | A | 8/2007 |
| TW | 201021220 | A | 6/2010 |
| WO | WO-2009043880 | A1 | 4/2009 |
| WO | WO-2011037563 | A1 | 3/2011 |

OTHER PUBLICATIONS

International Search Report, Jan. 11, 2012, PCT Patent Application No. PCT/US11/33287, Filed Apr. 20, 2011.

Padgett, Miles et al., "Light with a twist in its tail", Contemporary Physics, 2000, vol. 41, No. 5, pp. 275-285.

Chiu, C. H. et al., Broadband and omnidirectional antireflection employing disordered GaN nanopillars, Optics Express, vol. 16. No. 12. pp. 8748-8754, May 30, 2008.

Cui, Yonghao et al., "Electro-Thermally tunable Silicon Photonic Crystal Lens", IEEE 2010, pp. 188-191.

International Search Report, PCT Application No. PCT/US2011/033295, Korean Intellectual Property Office, Jan. 2, 2012.

Jahns, Jurgen, "Planar Packaging of Free-Space Optical Interconnections", IEEE, vol. 82 No. 11, Nov. 1994, pp. 1623-1631.

Takahashi, Kazuhiro et al., "A two-dimensional f-θ micro optical lens scanner with electrostatic comb-drive XY-stage", IEICE Electronics Express, vol. 2, No. 21 Nov. 10, 2005, pp. 542-547.

Zhou, Z. et al., Silicon nanophotonic devices based on resonance enhancement, Journal of Nanophotonics. vol. 4, 041001, Nov. 24, 2010.

Supplementary European Search Report, Nov. 17, 2014, European Patent Application No. 11863987.1, 3 pages.

* cited by examiner

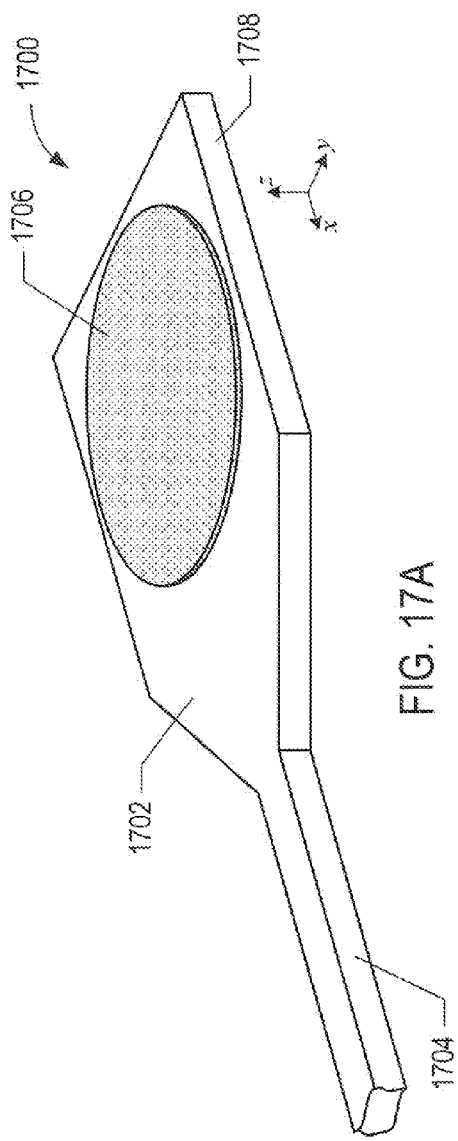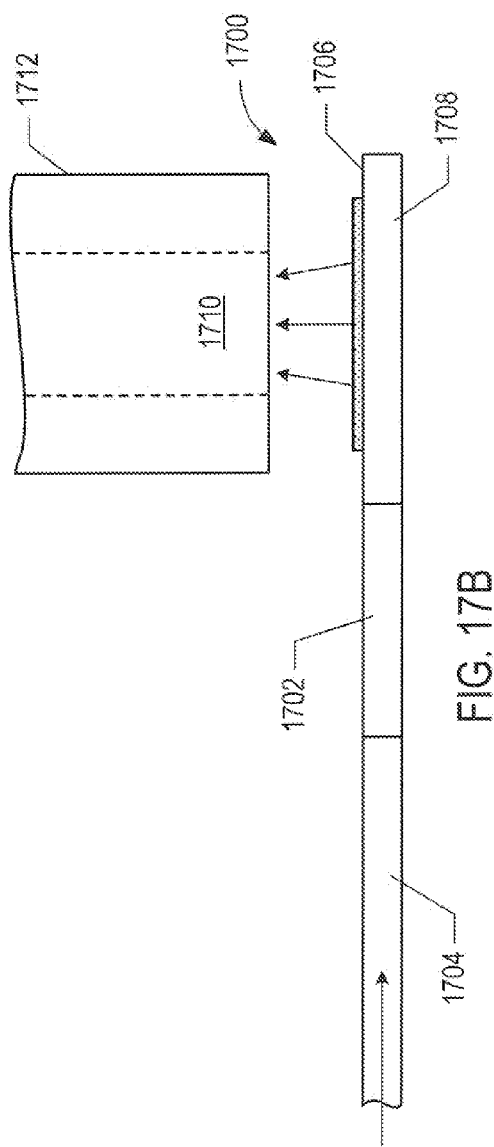
FIG. 17A
FIG. 17B

SUB-WAVELENGTH GRATING-BASED OPTICAL ELEMENTS

TECHNICAL FIELD

This disclosure relates to sub-wavelength gratings.

BACKGROUND

In recent years, microscale and nanoscale photonic devices and photonic interconnects have emerged as a potential high-speed, low-power alternative to traditional wires, cables, and conducting channels of high-performance computing systems. Photonic devices include semiconductor lasers, modulators, and detectors, and photonic interconnects include optical waveguides and couplers. Lasers and modulators can be used to perform electronic-to-optical signal conversion at a sending computing system. The optical signals are sent over photonic interconnects to detectors that perform optical-to-electronic signal conversion at a receiving computing system. In addition to providing high-speed, low-power advantages, many photonic devices and interconnects can be fabricated with CMOS-compatible technologies, enabling mass production at low cost and packaging with microelectronic devices.

Although much of photonics technology has been developed to enable waveguide-based optical communication, free-space optical communication remains a challenge. For instance, free-space optical signals may be used to transmit data between stacked optical and electronic devices. Unfortunately, fabricating and integrating miniaturized lenses with photonic devices to control the direction and focal length of the optical signals is cost prohibitive and time consuming. As a result, the computer industry continues to seek advancements in free-space optical communication that can be mass produced at low cost using CMOS-compatible technologies.

BRIEF DESCRIPTION OF THE DRAWINGS

FIGS. 17A-17B show isometric and side views of an example waveguide coupler.

DETAILED DESCRIPTION

Planar, polarization insensitive, optical elements to control refraction of transmitted light in free space are disclosed. An optical element includes a substrate and a sub-wavelength grating ("SWG") composed of a thin two-dimensional array of posts that extend perpendicular from a planar surface of the substrate. The lattice constant and cross-sectional dimensions of the posts are selected so that light is transmitted with a desired wavefront shape and/or direction. The SWGs can be fabricated using CMOS-compatible technologies and integrated with photonic devices to focus and direct the free-space path of light generated by the devices.

The detailed description is organized as follows. A general description of polarization insensitive optical elements is provided in a first subsection followed by a description of various examples of SWG patterns provided in a second subsection. An overview of example implementations of optical elements is provided in a third subsection.

In the following description, the term "light" refers to electromagnetic radiation with wavelengths in the visible and non-visible portions of the electromagnetic spectrum, including infrared and ultra-violet portions of the electromagnetic spectrum.

Sub-Wavelength Gratings

Figure 1A:
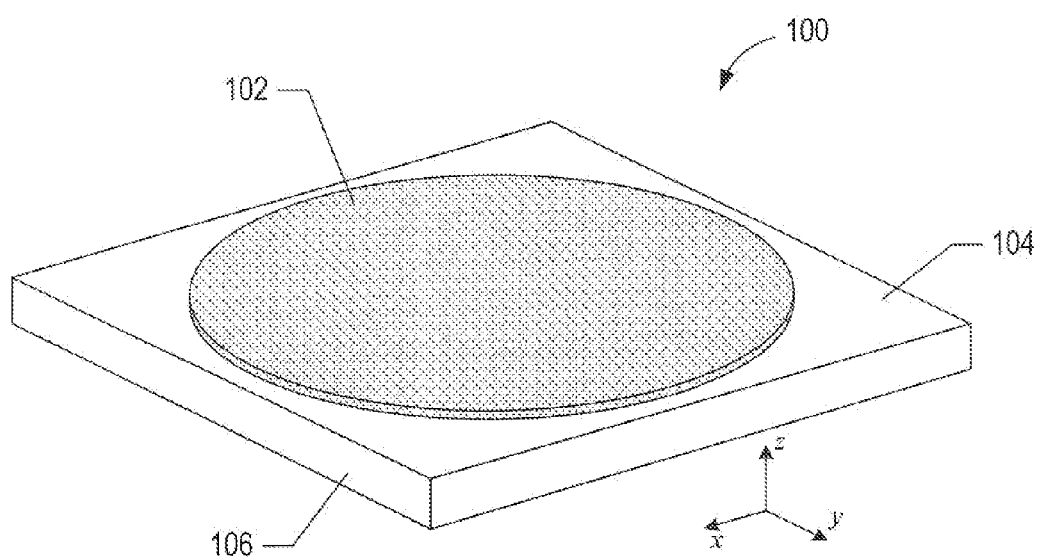
FIGS. 1A-1B show isometric and top views, respectively, of an example optical element.
Figure 1B:
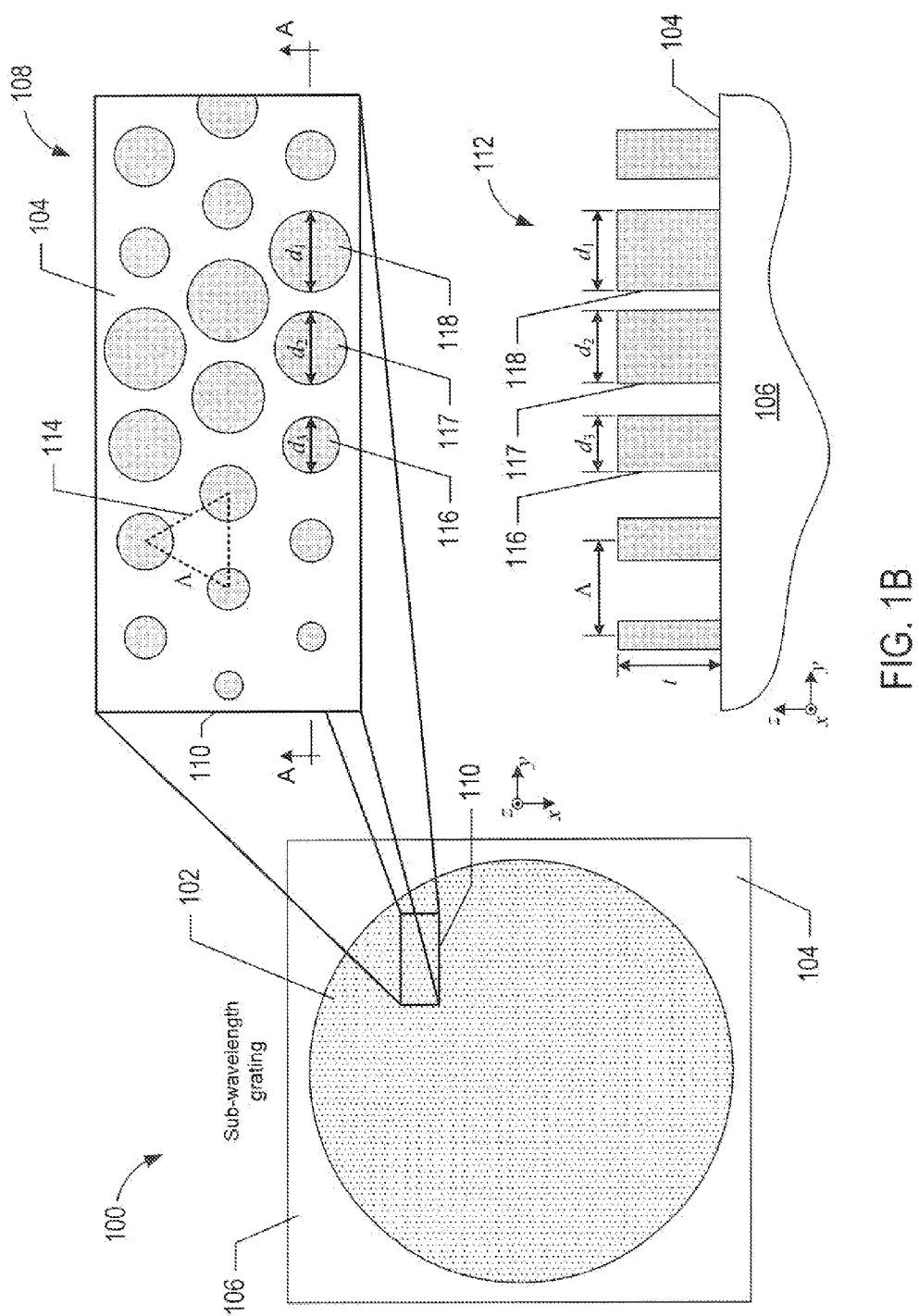

FIGS. 1A-1B show isometric and top views, respectively, of an example optical element 100. The element 100 includes a disk-shaped SWG 102 disposed on a planar surface 104 of a substrate 106. FIG. 1B includes a magnified view 108 of a region 110 of the SWG 102 and a cross-sectional view 112 of the region 110 along a line A-A. The views 108 and 112 reveal that the SWG 102 is composed of a two-dimensional hexagonal lattice of cylindrical posts extending approximately perpendicular from the surface 104. The hexagonal lattice of posts is characterized by an equilateral triangular unit cell 114 with a lattice constant, denoted by $\Lambda$, that corresponds to the distance between the centers of any pair of adjacent posts.

The SWG 102 can be composed of a single elemental semiconductor, such as silicon ("Si") and germanium ("Ge"), or a compound semiconductor, such as a III-V compound semiconductor, where Roman numerals III and V represent elements in the IIIa and Va columns of the Periodic Table of the Elements. III-V compound semiconductors can be composed of column IIIa elements, such as aluminum ("Al"), gallium ("Ga"), and indium ("In"), in combination with column Va elements, such as nitrogen ("N"), phosphorus ("P"), arsenic ("As"), and antimony ("Sb"). III-V compound semiconductors can also be further classified according to the relative quantities of III and V elements. For example, binary semiconductor compounds include semiconductors with empirical formulas GaAs, InP, InAs, and GaP; ternary compound semiconductors include semiconductors with empirical formula $GaAs_yP_{1-y}$, where y ranges from greater than 0 to less than 1; and quaternary compound semiconductors include semiconductors with empirical formula $In_xGa_{1-x}As_yP_{1-y}$, where both x and y independently range from greater than 0 to less than 1. Other types of suitable compound semiconductors include II-VI materials, where II and VI represent elements in the IIb and VIa columns of the periodic table. For example, CdSe, ZnSe, ZnS, and ZnO are empirical formulas of exemplary binary II-VI compound semiconductors.

The substrate 104 can be composed of material having a relatively lower refractive index than the SWG 102. For example, the substrate 106 can be composed of quartz, silicon dioxide ("SiO$_2$"), aluminum oxide ("Al$_3$O$_2$"), or a polymer.

Optical elements are compact and can be fabricated with many of the same CMOS-compatible techniques used to fabricate microelectronic devices. For example, an optical element can be fabricated by depositing a semiconductor layer on a planar surface of a substrate using wafer bonding or chemical or physical vapor deposition. The posts comprising an SWG can be formed in the semiconductor layer using photolithography, nanoimprint lithograph, reactive-ion etching, or roll-to-roll processing.

The SWG 102 is a high-contrast SWG because of the relatively high contrast between the refractive index of the material comprising the SWG 102 and the refractive index of the substrate 106, which can be created by forming the posts so that portions of the substrate 106 are exposed between the posts, as shown in the cross-sectional view 112. For example, the elemental semiconductors and many III-V compound semiconductors that can be used to form the SWG 102 have effective refractive indices greater than approximately 3.5 when interacting with light of a wavelength 632.8 nm. By contrast, quartz, SiO$_2$, and polyacrylate used to form the substrate 106 have effective refractive indices less than approximately 1.55 when interacting with light of the same wavelength 632.8 nm.

The lattice constant Λ of the SWG 102 is selected so that the optical element 100 does not scatter light into the substrate in an unwanted manner. Unwanted scattering can be prevented by selecting the lattice constant based on a no-scattering limit given by:

$$\Lambda < \frac{2}{\sqrt{3}} \frac{\lambda}{n_s}$$

where $n_s$ is the refractive index of the substrate 106. In addition to selecting the lattice constant based on the no-scattering limit, the element 100 can be configured so that the desired phase difference between two posts separated by Λ is less than π, so that the desired output phase is determined by the lattice at a high enough spatial density. The element 100 can also be configured with a certain numerical aperture ("NA") imposed by the constraint:

$$\Lambda \leq \frac{\lambda}{2 \cdot NA}$$

The SWG 102 is also a "non-periodic" SWG. In other words, the diameters of the posts comprising the SWG 102 are varied. For example, as shown in FIG. 1B, neighboring posts 116-118 have different post diameters $d_1$, $d_2$, and $d_3$, where $d_1 < d_2 < d_3$. The SWG 102 is also referred to as a "sub-wavelength grating" because the post diameters d and lattice constant Λ are less than the wavelength λ of the light for which the SWG 102 is configured to interact.

The resonance of the SWG 102 with the wavelength λ is determined by the duty cycle and the thickness of the SWG 102. The duty cycle for a SWG with posts having circular cross sections is given by:

$$\delta = \frac{d}{\Lambda}$$

and the thickness t of the SWG 102 can be selected to allow a large differential phase shift as the duty cycle is varied where:

$$t < \frac{\lambda}{(n_{SWG} - n_s)}$$

where $n_{SWG}$ is the effective refractive index of the SWG 102 at the wavelength λ. The duty cycle δ over certain regions of the SWG 102 can be selected so that the SWG 102 is approximately "off-resonance" with the wavelength λ resulting in a majority of the light being transmitted through the regions with a high transmittance. Alternatively, the duty cycle over other regions of the SWG 102 can be selected so that the SWG 102 is approximately "on-resonance" with the wavelength λ resulting in a majority of the light being reflected from the other regions with a high reflectance.

Figure 2:
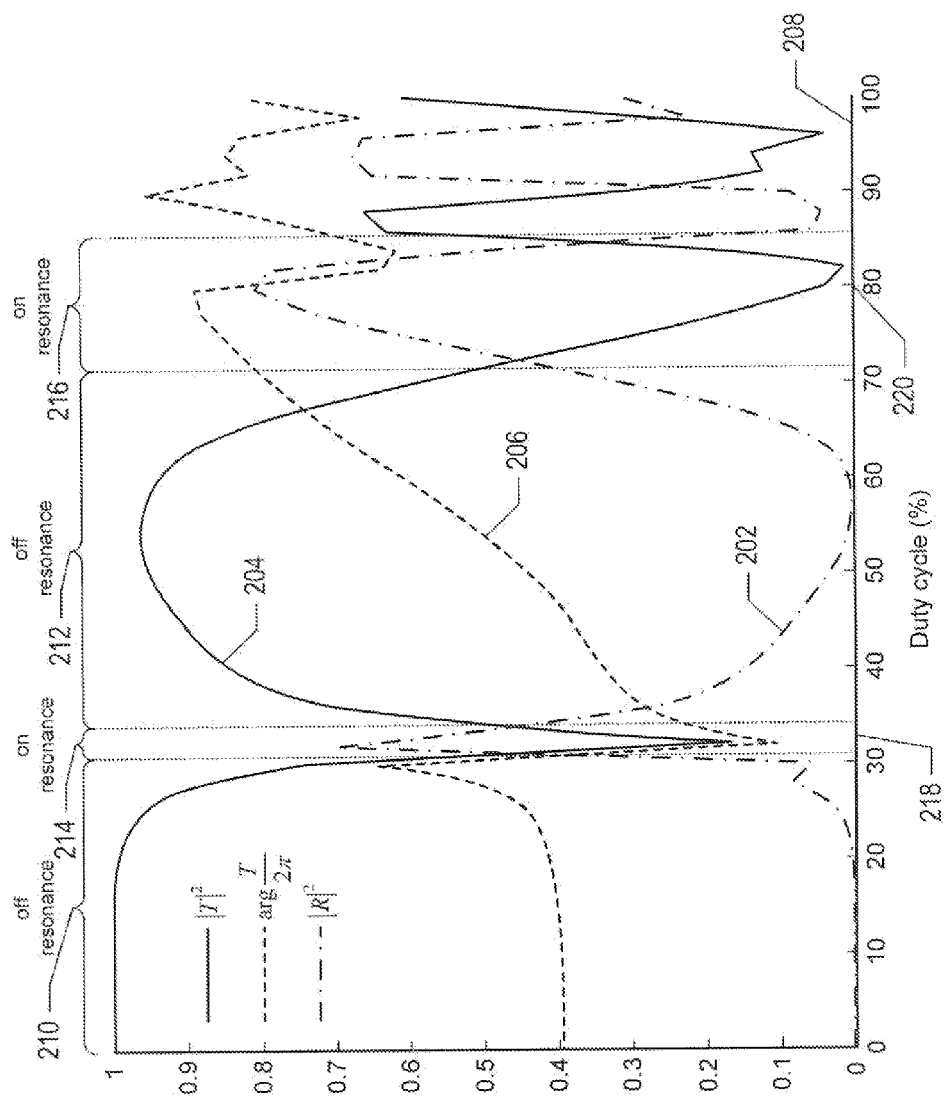
FIG. 2 shows example plots of reflection and transmission coefficients and transmitted phase for a sub-wavelength grating composed of a hexagonal lattice of posts.

FIG. 2 shows example plots of reflection and transmission coefficients and transmitted phase based on simulation results for a SWG composed of a hexagonal lattice of Si posts in an oxide matrix. Dot-dash curve 202 represents the squared norm of the reflection coefficient, $|R|^2$, solid curve 204 represents the squared norm of the transmission coefficient, $|T|^2$, and dashed curve 206 represents the transmitted phase, arg $(T/2\pi)$, for light with normal incidence and wavelength 650 nm. The curves 202, 204, and 206 were generated using the open source finite-difference time-difference software MEEP described in "A flexible free-software package for electromagnetic simulations by the FDTD method," A. F. Oskooi et al., *Computer Physics Communications*, 181, 687-702 (2010). The curves 202, 204, and 206 were determined for posts with a fixed thickness of approximately 130 nm, a fixed lattice constant of approximately 475 nm, while the duty cycle was varied from 0% to 100%, as represented by horizontal axis 208. Curves 202 and 204 reveal that the reflection and transmission of light vary smoothly with variations in the duty cycle over the off-resonance intervals 210 and 212. Portions of the off-resonance intervals 210 and 212 indicate that a large portion of the incident light is transmitted through the SWG for duty cycles in the range from 0% to approximately 30% and in the range from approximately 35% to approximately 68%. On the other hand, on-resonance intervals 214 and 216 reveal abrupt decreases in the transmission and increases in the reflection of the light for narrower duty cycle ranges. In particular, the transmission coefficient is less than approximately 0.4 for duty cycles in the narrow range from approximately 31% to approximately 33% and in the range from approximately 74% to approximately 85% with the strongest resonance or reflection occurring for duty cycles at approximately 32% 218 and approximately 80% 220. The transmitted phase over the off-resonance interval 210 remains flat for duty cycles below approximately 25% but increases sharply as the duty cycle approaches 30%. In the on-resonance interval 214, the transmitted phase decreases between approximately 30% and 32%. Between approximately 32% and approximately 80% the transmitted phase 206 varies smoothly over a large range of transmitted phases.

The data represented by the reflection and transmission coefficients and the transmitted phase shown in FIG. 2 can be used to design the SWG of an optical element with desired optical properties, such as desired deflection and/or focusing properties. In particular, the larger the post size, the longer light remains trapped within the posts. As a result, a larger transmitted phase is acquired by light transmitted through regions of an SWG with posts having larger dimensions than other regions of the same SWG with posts having smaller dimensions. A SWG with desired optical properties can be obtained by varying the dimensions of the posts while holding the lattice constant fixed (e.g., $\delta(x, y)=d(x, y)/\Lambda$), varying the lattice constant while holding the dimensions of the posts fixed (e.g., $\delta(x, y)=d/\Lambda(x, y)$), or by varying the lattice constant and the dimensions of the posts (e.g., $\delta(x, y)=d(x, y)/\Lambda(x, y)$), where (x, y) is a coordinate in the xy-plane of the SWG.

The SWG of an optical element can also be designed to interact with a particular wavelength λ of light by applying a property of Maxwell's equations that relates to a uniform scale of transformation in the design of the SWG. In particular, consider a first SWG configured with a duty cycle $\delta(x, y)$, thickness t, and lattice constant $\Lambda(x, y)$ that produces a complex transmission coefficient $T_0$ and reflection coefficient $R_0$ at a free-space wavelength $\lambda_0$. A second SWG can be obtained with approximately the same optical properties as the first SWG but for a different wavelength $\lambda_0$, by fabricating the second SWG with a duty cycle $\alpha\delta(x, y)$, thickness $\alpha t$, and lattice constant $\alpha\Lambda(x, y)$, where $\alpha=\lambda/\lambda_0$ is a scale factor and provided $\alpha\Lambda(x, y)$ satisfies the no-scattering limit and the numerical aperture constraint. For example, the second SWG has a transmission coefficient $T(\lambda)=T_0(\lambda/\alpha)=T_0(\lambda_0)$ and a reflection coefficient $R(\lambda)=R_0(\lambda/\alpha)=R_0(\lambda_0)$.

Figure 3B:
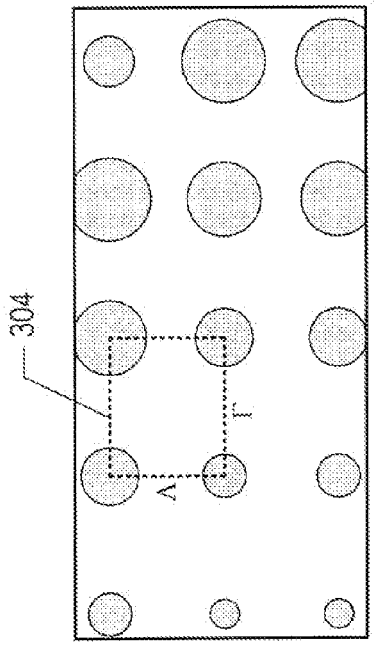
FIGS. 3A-3D show four examples of sub-wavelength grating two-dimensional lattice types.
Figure 3D:
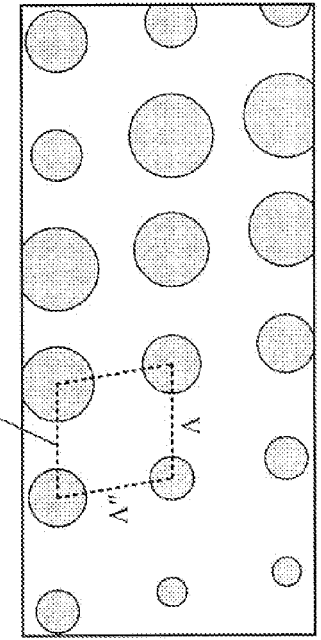
Figure 3A:
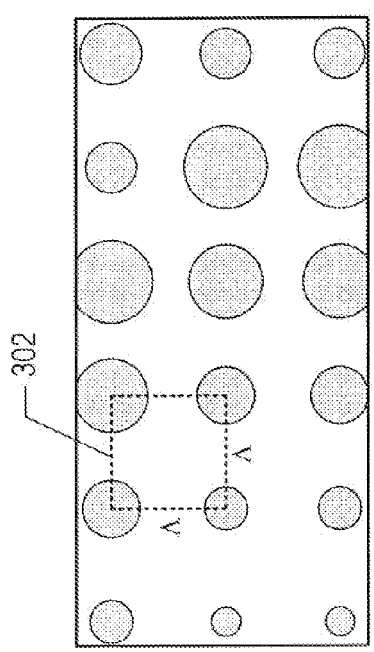
Figure 3C:
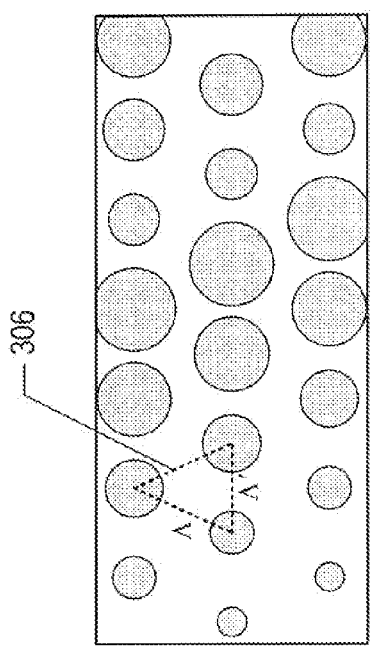

SWGs are not limited to a hexagonal lattice of post, as shown in FIG. 1B. Alternatively, the lattice of an SWG can be square, rectangular, rhombic, or parallelogrammic FIG. 3A shows an example magnified top view of a region of an SWG with a square lattice of posts represented by a square unit cell 302. FIG. 3B shows an example magnified top view of a region of an SWG with a rectangular lattice of posts represented by a rectangular unit cell 304. FIG. 3C shows an example magnified top view of a region of an SWG with a rhombic lattice of posts represented by an isoscelese triangle unit cell 306. Finally, FIG. 3D shows an example magnified top view of a region of an SWG with a parallelogrammic lattice of posts represented by a parallelogram unit cell 308. An SWG may also be composed of at least two different lattices types. For example, the posts in certain regions of an SWG can have a square lattice arrangement and posts in other regions of the same SWG can have a rectangular lattice arrangement.

The posts of the SWG 102 are also not limited to having circular cross-sections, as shown in FIGS. 1 and 3. Alternatively, the posts of an SWG can have square, triangular, rectangular, elliptical, or irregular-shaped cross-sectional shapes.

Examples of Sub-Wavelength Gratings

In this subsection, three examples of polarization insensitive SWG post patterns of optical elements are described. Each of the example SWG post patterns described below is based on a fixed lattice constant while dimensions of the posts are varied to produce a different optical effect on the light transmitted through the optical element. However, SWG post patterns are not intended to be limited to these three examples. As explained in the preceding section, the transmitted phase front or wavefront of the light transmitted through a SWG is controlled by the size of the posts and the lattice constant. In other words, the post sizes and/or lattice constants can be selected to achieve a desired transmitted phase front and corresponding wavefront in the transmitted light.

Figure 4:
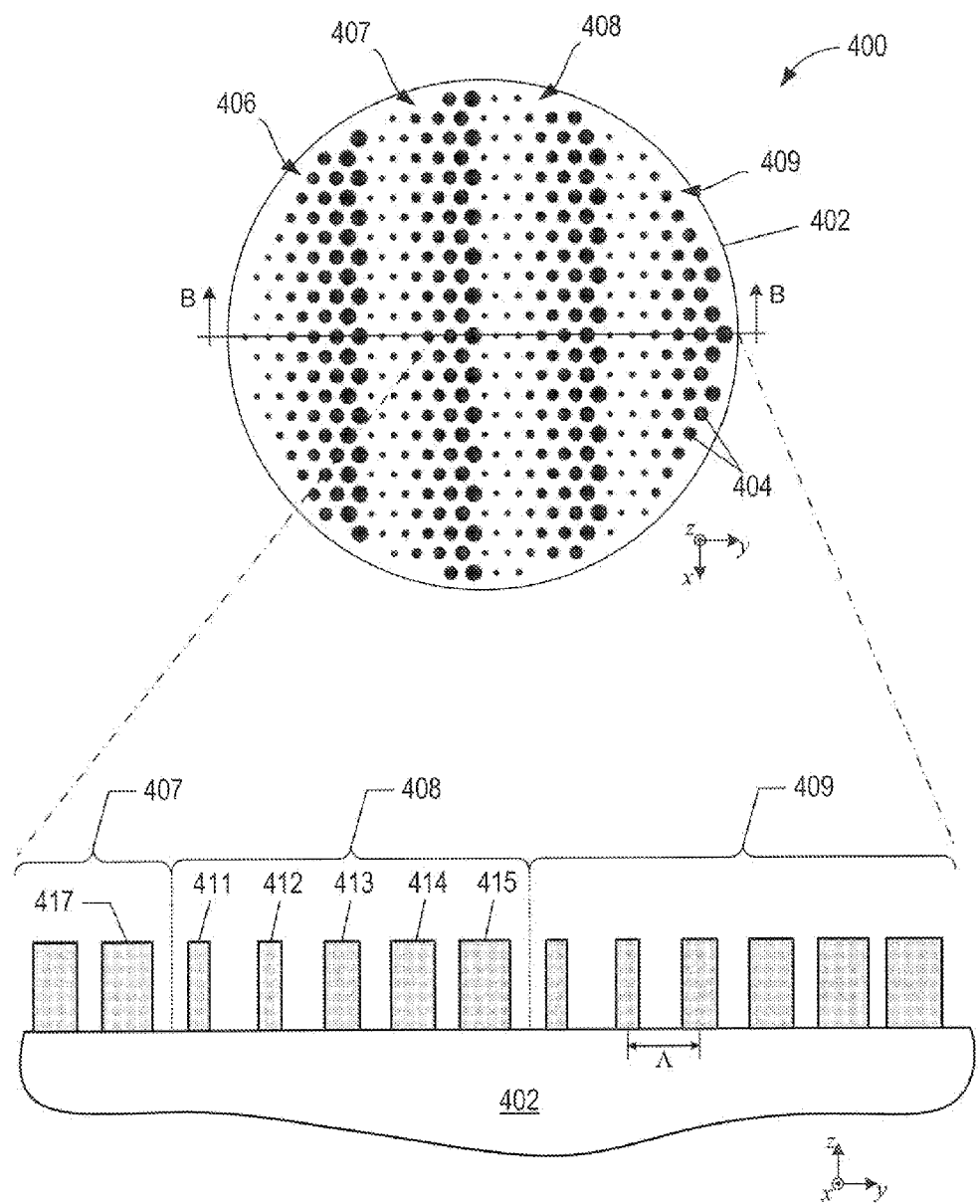
FIG. 4 shows a top view of an example optical element configured to deflect transmitted light with a desired angle of transmission.

Consider first an SWG of an optical element configured to deflect transmitted light with a desired angle of transmission. FIG. 4 shows a top view of an example optical element 400 configured to deflect transmitted light with an approximately 15° angle of transmission. The element 400 includes a substrate 402 and a SWG composed of a two-dimensional hexagonal lattice of cylindrical posts represented by shaded circles 404. The posts comprising the SWG extend perpendicular from a planar surface of the substrate 402 and the diameters of the posts are varied to form four separate regions 406-409. As shown in FIG. 4, in each region the diameters of the posts systematically increase in the y-direction, while in the x-direction, the diameters of the posts are constant. The pattern of systematic increase of the post diameter in the y-direction is repeated for each region. Systematic increases in the diameters of the posts in the y-direction while holding lattice constant Λ fixed also corresponds to an increase in the duty cycle in the y-direction.

FIG. 4 also shows a magnified yz-plane cross-sectional view of posts located along a portion of a line segment B-B that extends in the y-direction. The posts are approximately equally spaced in the y-direction by a fixed lattice Λ. The diameters of the posts within each region increases in the y-direction. In region 408, the diameters of posts 411-415 increase in the y-direction with post 412 having the smallest diameter located adjacent to the post 417 with the largest diameter along the line B-B in region 407 and the post 415 having the largest diameter. The magnified view reveals that the systematic increase in post diameters is repeated in region 409.

Figure 5:
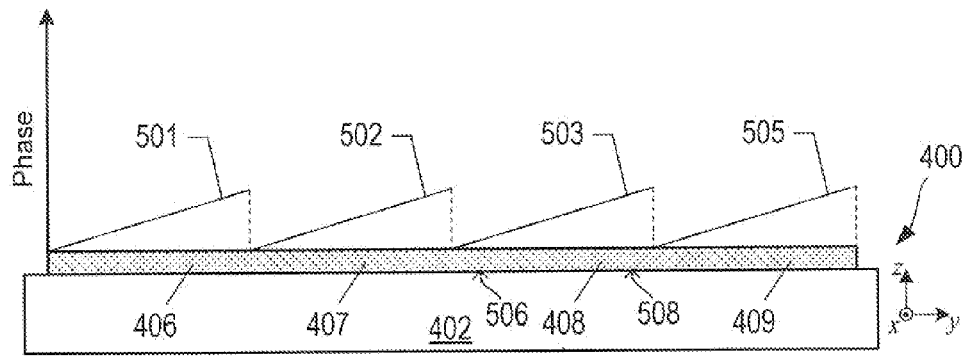
FIG. 5 shows a cross-sectional view of the optical element shown in FIG. 4 with the transmitted phase represented.

FIG. 5 shows a cross-sectional view of the optical element 400 along the line B-B, shown in FIG. 4, with the transmitted phase associated with each of the regions 406-409 represented by line segments 501-504, respectively. The duty cycles in each region are selected so that the regions 406-409 each apply approximately the same linearly varying transmitted phase to transmitted electromagnetic waves. In particular, transmitted phases 501-504 reveal that the magnitude of the transmitted phase applied to electromagnetic waves transmitted through the regions 406-409 is proportional to the duty cycle over sub-regions of the regions 406-409. The larger the duty cycle in a sub-region of a region, the larger the transmitted phase acquired by an electromagnetic wave transmitted through the sub-region. For example, as shown in FIG. 4, the duty cycle in region 408 increases in the y-direction. Returning to FIG. 5, transmitted phase 503 is positively sloped in the y-direction. The transmitted phase 503 indicates that an electromagnetic wave transmitted through a sub-region 506 acquires a smaller transmitted phase than the transmitted phase acquired by an electromagnetic wave of the same wavelength transmitted through a different sub-region 508.

Figure 6:
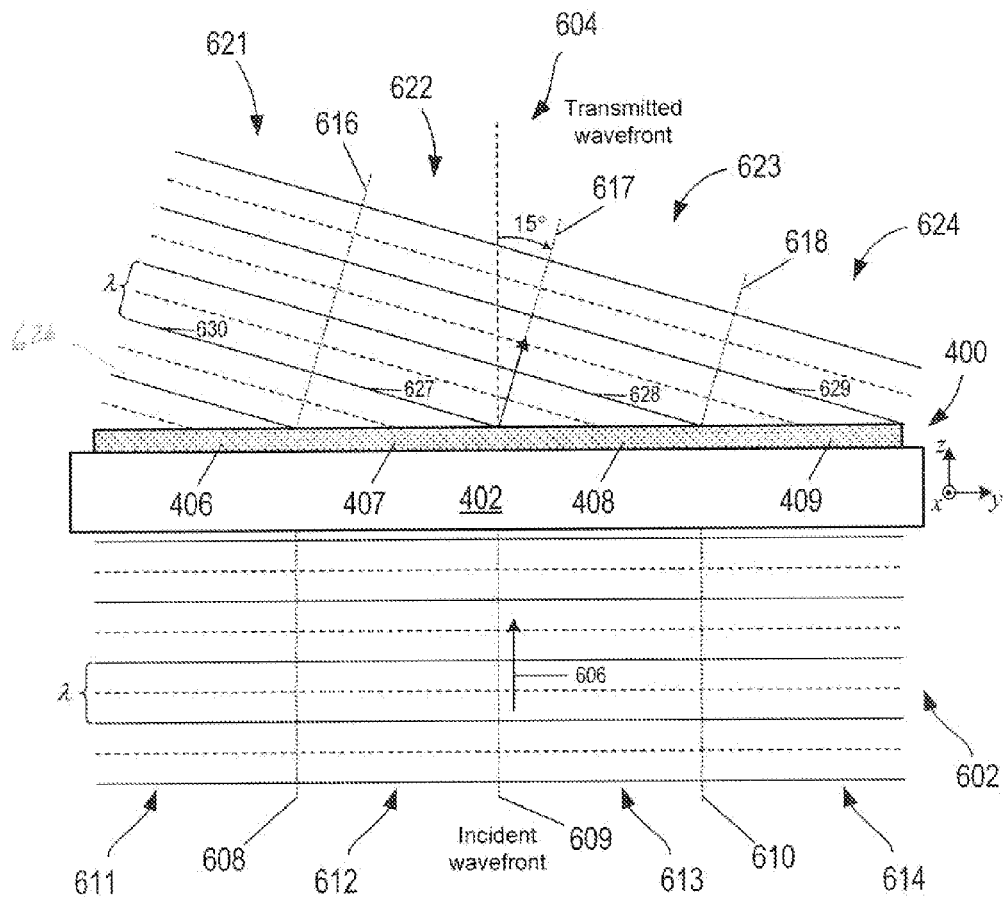
FIG. 6 shows a cross-sectional view of the optical element shown in FIG. 4 along the line A-A with a snapshot of a planar incident wavefront and a planar transmitted wavefront represented.

FIG. 6 shows a cross-sectional view of the optical element 400 along the line B-B with a snapshot of a planar incident wavefront 602 and a planar transmitted wavefront 604 represented. Crests and troughs of the incident and transmitted wavefronts are represented by solid lines and dashed lines, respectively. The incident wavefront 602 strikes the optical element 400 with normal incidence, as indicated by a wavevector 606 directed perpendicular to the SWG of the element 400, and is output as the transmitted wavefront 604 with a 15° angle of transmission. Dotted-lines 608-610 distinguish four different segments 611-614 of the incident wavefront 602 with each segment transmitted through one of the four different regions 406-409 of the SWG. Each segment of the incident wavefront acquires a transmitted phase represented by transmitted phases 501-504 shown in FIG. 5. As a result, each segment of the incident wavefront is output from a region of the SWG with approximately the same 15° angle of transmission. Dotted-lines 616-618 distinguish four different segments 621-624 of the transmitted wavefront 604 with each segment output from one of the four different regions 406-409 of the SWG. The segments of the transmitted wavefront 604 emerge so that crests and troughs of adjacent segments are approximately aligned to merge and form the crests and troughs of the transmitted wavefront 604. For example, crests 626-629 originated from a single crest of the incident wavefront 602 but emerge from the SWG as four separate wavefronts that do not merge to form a single crest of the transmitted wavefront 604. Instead, each crest merges with at least one crest of an adjacent segment separated by a transmission phase difference of $2\pi$ radians. For example, even though crest 630 reaches the element 400 $2\pi$ radians ahead of the crest 627, the crest 630 merges from the region with a 15° angle of transmission. As the crest 630 finishes emerging from the region 406, the crest 627 starts to emerge from the region 407 also with a 15° angle of transmission and merges with the crest 630 to form a single crest, which grows in length by merging with a crest that emerges from the region 408 $2\pi$ radians behind the crest 627.

Figure 7:
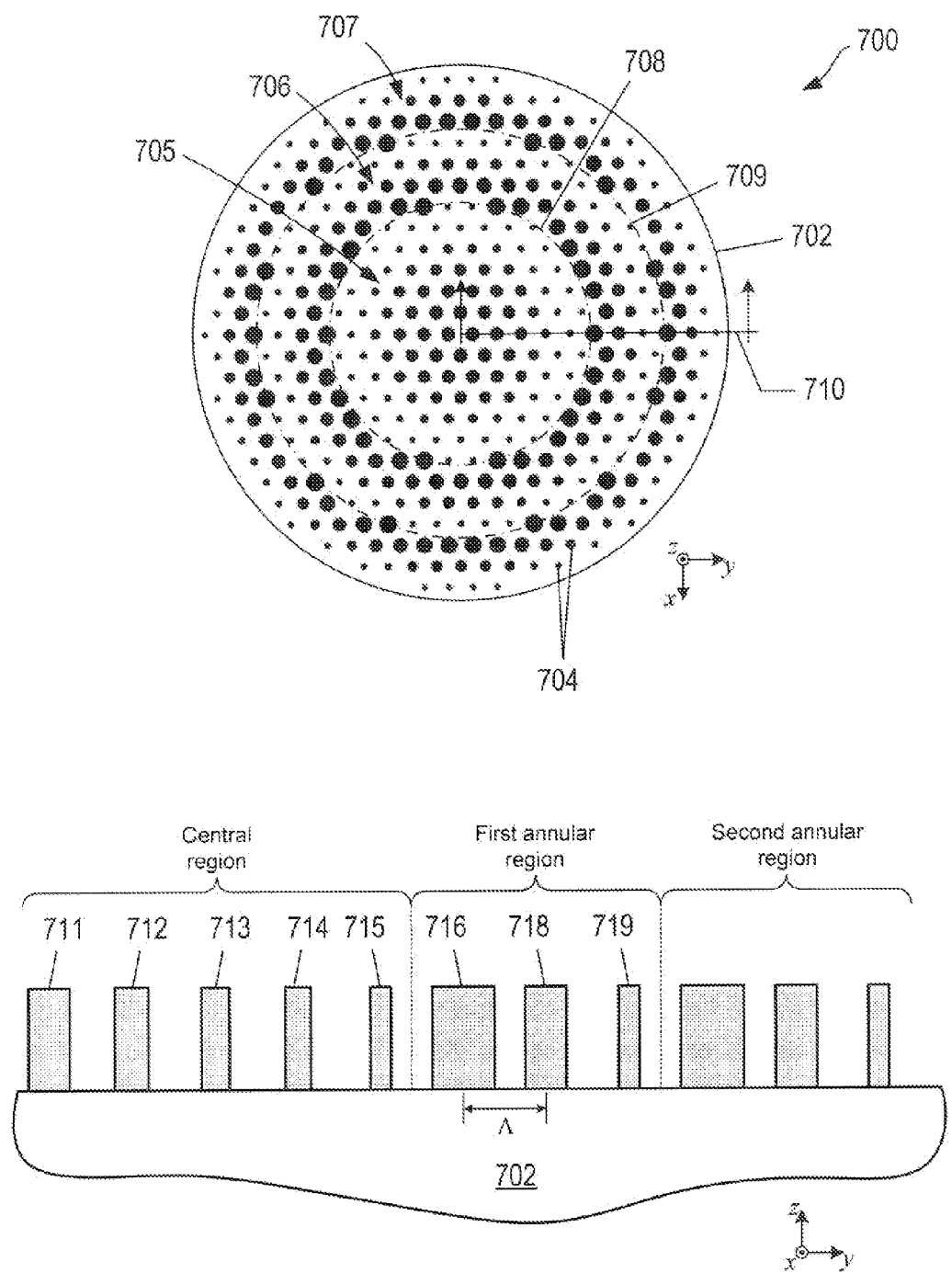
FIG. 7 shows a top view of an example optical element configured to operate as a spherical focusing lens.

The duty cycle of an SWG can also be patterned so that an optical element can be operated as a spherical focusing lens. FIG. 7 shows a top view of an example optical element 700 configured to operate as a spherical focusing lens. The element 700 includes a substrate 702 with a planar surface and a SWG composed of a two-dimensional hexagonal lattice of cylindrical posts represented by shaded circles 704. The posts comprising the SWG extend perpendicular from the surface of the substrate 702 and the diameters of the posts are varied to form a circular-shaped central region of posts 705 that lie substantially within a circle 708 and two concentric annular regions of posts 706 and 707 the first of which is composed of posts that lie between the circle 708 and a larger radius circle 709 and the second of which is composed of posts that lie outside the circle 709. As shown in FIG. 7, in each region the duty cycle systematically decreases away from the center of the SWG, with the systematic decrease in duty cycle away from the center of the SWG repeated for each region.

FIG. 7 also shows a magnified yz-plane cross-sectional view of posts located along a line segment 710. The posts are spaced in the y-direction by a fixed lattice constant $\Lambda$. The diameters of the posts within each region decrease in the y-direction away from the center of the SWG. In the central region, the diameters of posts 711-715 decrease in the y-direction with the post 711 located near the center of the SWG having the largest diameter and the post 715 located farthest from the center having the smallest diameter. The magnified view also reveals the systematic decrease in post diameters in the first and second annular regions. For example, in the first annular region 706, the diameters of posts 716-718 decrease in the y-direction with the post 716 located closest to the center of the SWG having the largest diameter and the post 718 located farthest from the center of the SWG having the smallest diameter. The pattern of systematic post diameter decrease away from the center of the SWG is repeated for the second annular region 707.

Figure 8:
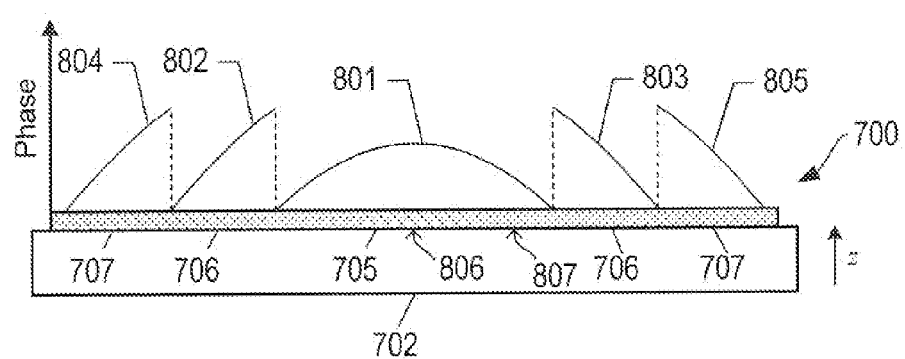
FIG. 8 shows a cross-sectional view of the optical element shown in FIG. 7 along a line that passes through the center of the optical element with the transmitted phase represented.

FIG. 8 shows a cross-sectional view of the optical element 700 along any line that lies in the xy-plane and passes through the center of the SWG. The transmitted phase associated with the circular region 705 is represented by a parabolic curve 801, the transmitted phase associated with the first annular region 706 is represented by curves 802 and 803, and the transmitted phase associated with the second annular region 707 is represented by curves 804 and 805. The duty cycle in each region is varied as described above with reference to FIG. 7 so that the regions 705-707 apply transmitted phases represented by the curves 801-805. Like the optical element 400, transmitted phases 801-805 reveal that the magnitude of the transmitted phase applied to electromagnetic waves transmitted through the regions 705-707 is proportional to the duty cycle over sub-regions of the regions 705-707. The larger the duty cycle associated with a sub-region, the larger the transmitted phase acquired by an electromagnetic wave transmitted through the sub-region. For example, as shown in FIG. 7, the duty cycle in the central region 705 decreases away from the center of the SWG. Returning to FIG. 8, transmitted phase 801 indicates that the transmitted phase acquired by an electromagnetic wave transmitted through a sub-region 806 is greater than the transmitted phase acquired by an electromagnetic wave transmitted through a sub-region 807.

Figure 9:
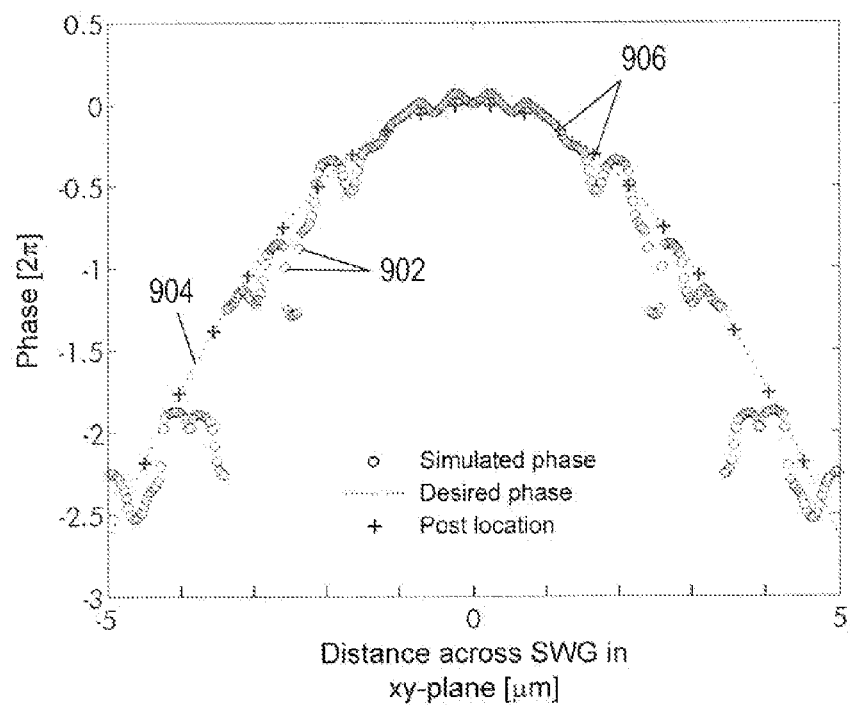
FIG. 9 shows a plot of simulated transmitted phase, desired transmitted phase, and post locations for the optical element shown in FIG. 7.

FIG. 9 shows a plot of simulated transmitted phase 902, desired transmitted phase 904, and post locations 906 for the optical element 700. The simulated transmitted phase 902 data is represented by open circles and was obtained using the open source FTDT software MEEPs for a SWG composed of Si posts in an oxide matrix. The SWG has a diameter of approximately 10 µm. The simulated transmitted phase 902 indicates that the SWG of the optical element 700 should produce a transmitted phase that closely matches the desired transmitted phase 904 with a few exceptions at approximately ±2.5 µm and in the intervals between approximately −3.4 µm and −4 µm and approximately 3.4 µm and 4 µm, where the simulated phase 902 indicates that the optical element 700 may apply a larger transmitted phase than desired.

Figure 10:
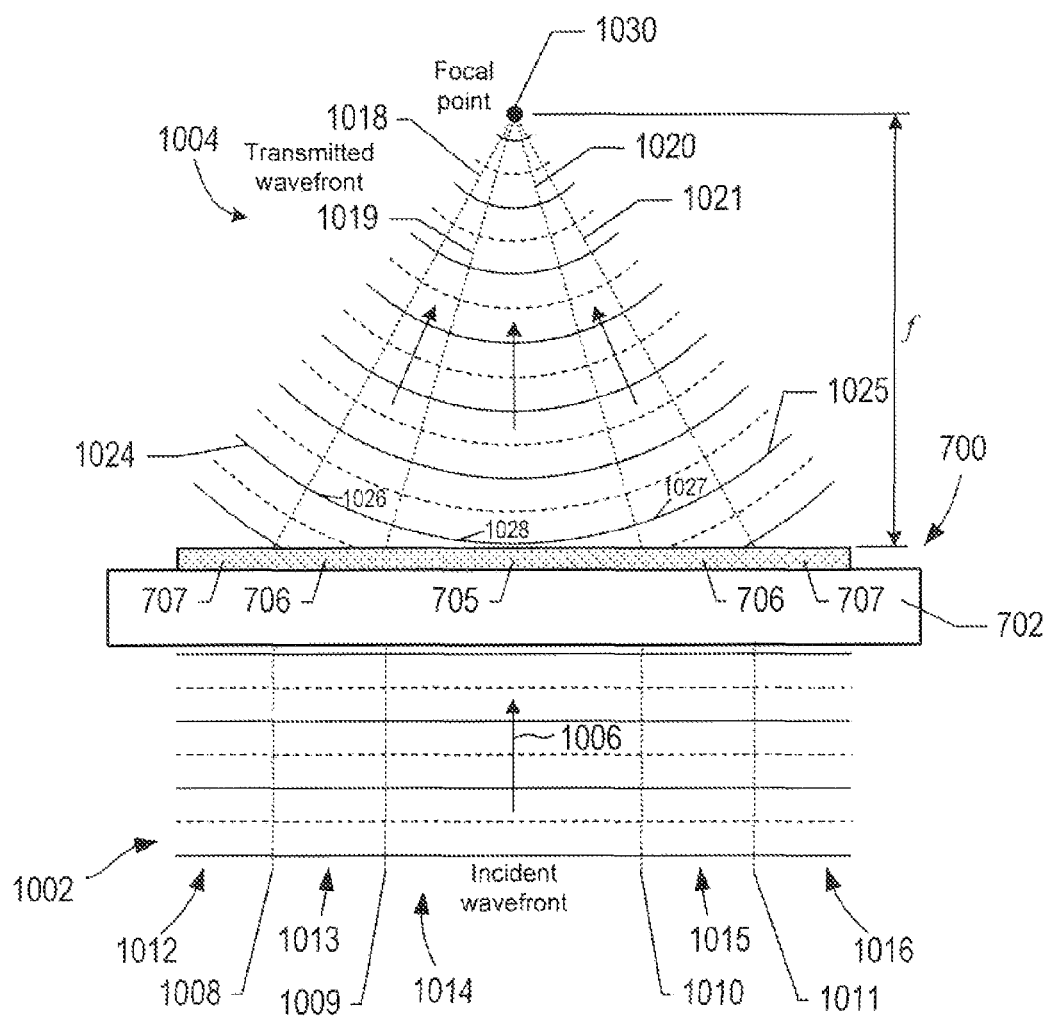
FIG. 10 shows a cross-sectional view of the optical element shown in FIG. 7 with a snapshot of a planar incident wavefront and a transmitted wavefront represented.

FIG. 10 shows a cross-sectional view of the optical element 700 with a snapshot of a planar incident wavefront 1002 and a transmitted wavefront 1004 represented. The incident wavefront 1002 strikes the optical element 700 with normal incidence, as indicated by a wavevector 1006 directed perpendicular to the SWG of the element 700, and is output as the convergent transmitted wavefront 704. Dotted-lines 1008-1011 distinguish five different segments 1012-1016 of the incident wavefront 1002 with each segment transmitted through one of the sub-regions of different regions 705-707 of the SWG. Each segment of the incident wavefront 1002 acquires a transmitted phase represented by transmitted phases 801-805 shown in FIG. 8. As a result, each segment of the incident wavefront is output from a region of the SWG with a curved transmitted wavefront. Dotted-lines 1018-1021 distinguish curved segments of the transmitted wavefront 1004 with each segment output from sub-regions of the regions 705-708 of the SWG. The segments of the transmitted wavefront emerge so that curved crests and troughs of adjacent transmitted wavefront segments are approximately aligned to merge and form the circular-shaped crests and troughs of the transmitted wavefront 1004. Each crest merges with at least one crest of an adjacent transmitted segment separated by a transmission phase difference of $2\pi$ radians. For example, crests 1024 and 1025 originated from segments of the same incident crest that reach the element 700 $2\pi$ radians radians ahead of crests 1026 and 1027. The crests 1024 and 1025 merge with the crests 1026 and 1027 because when the crests 1024 and 1025 finish emerging from the region 708 the crests 1026 and 1027 start to emerge from the region 707, which grows into a semi-circular crest of the transmitted wavefront 1004 by merging with a curved crest 1028 that originated from a crest of the incident wavefront 1002 transmitted 2π radians behind the crests 1026 and 1027. The duty cycles of the regions 705-707 are selected so that the transmitted wavefront 1004 converges on a focal point 1030 with a focal length f.

Figure 11:
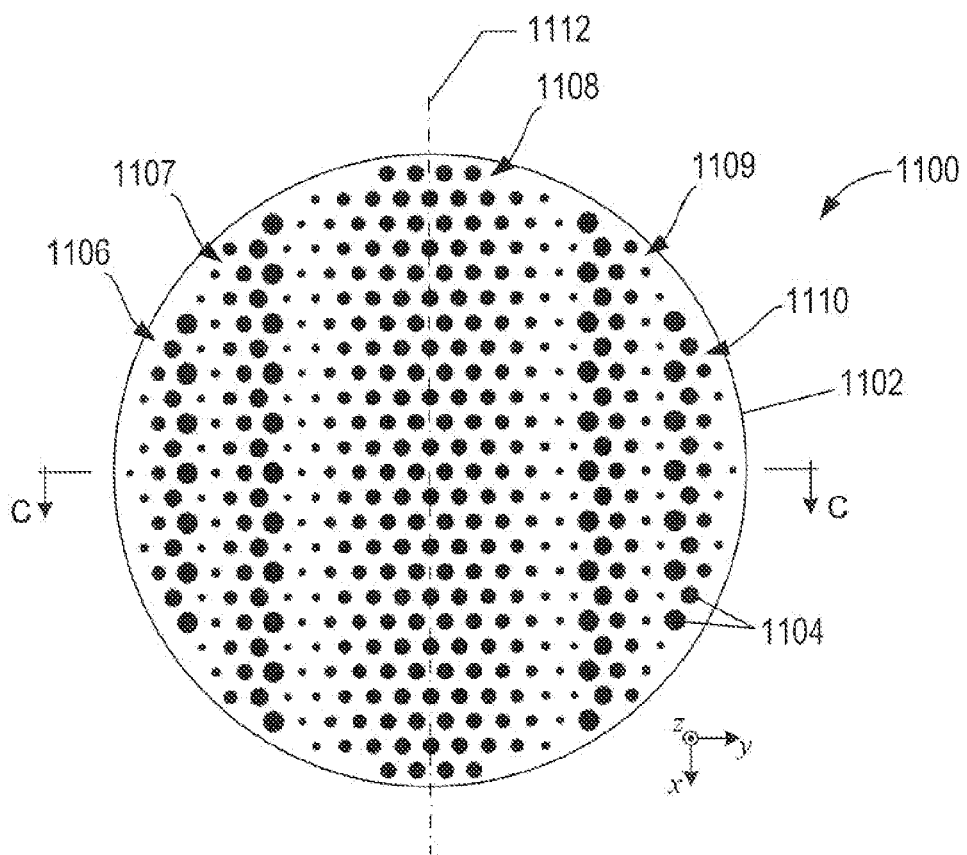
FIG. 11 shows a top view of an example optical element configured to operate as a cylindrical focusing lens.

The duty cycle of the posts can also be patterned so that an optical element can be operated as a cylindrical focusing lens. FIG. 11 shows a top view of an example optical element 1100 configured to operate as a cylindrical focusing lens. The element 1100 includes a substrate 1102 with a planar surface and a SWG composed of a two-dimensional hexagonal lattice of cylindrical posts represented by shaded circles 1104. The posts comprising the SWG extend perpendicular to the surface of the substrate 1102 and diameters of the posts are varied to form five separate regions 1106-1110. As shown in FIG. 11, in each region the diameters of the posts systematically decrease away from a central line 1112, with the systematic decrease in post cross-sectional areas repeated for each region, while in the x-direction, the cross-sectional areas of the posts are constant.

Figure 12:
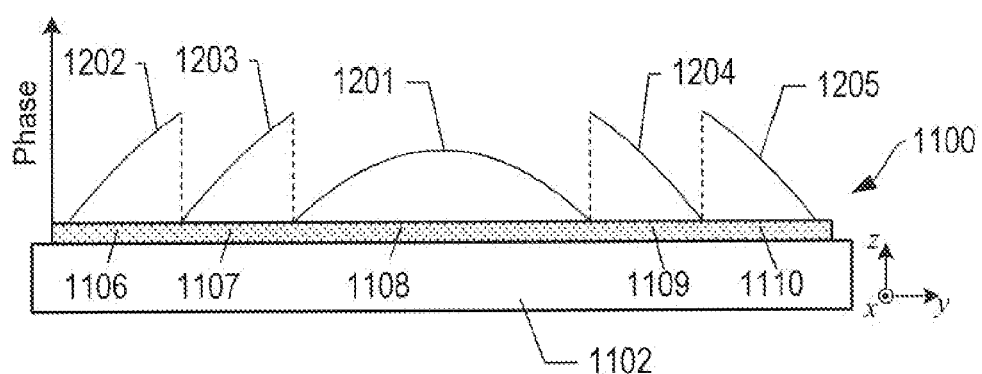
FIG. 12 shows a cross-sectional view of the optical element shown in FIG. 11 with the transmitted phase represented.

FIG. 12 shows a cross-sectional view of the optical element 1100 along a line C-C shown in FIG. 11. The transmitted phase in the y-direction over region 1108 is represented by a parabolic curve 1201, the transmitted phases associated with the regions 1106, 1107, 1109, and 1110 are represented by curves 1202-1205, respectively. The transmitted phase is substantially constant in the x-direction. In other words, the SWG of the optical element 1100 produces nearly the same transmitted profile in the yz-plane as the optical element 700 does through any plane passing through the center of the element 700 and oriented perpendicular to the SWG of the element 700.

The optical element 1100 focuses transmitted light in the yz-plane in the nearly the same manner as the optical element 700 described above with reference to FIG. 10.

Example Implementations of Optical Elements

Figure 13A:
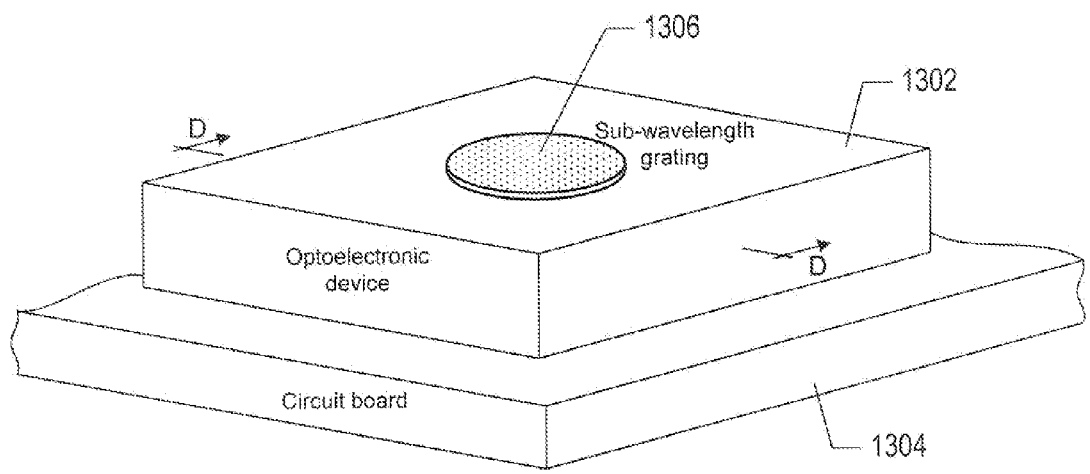
FIGS. 13A-13B show isometric and cross-sectional views of an example optoelectronic device with an integrated optical element.
Figure 13B:
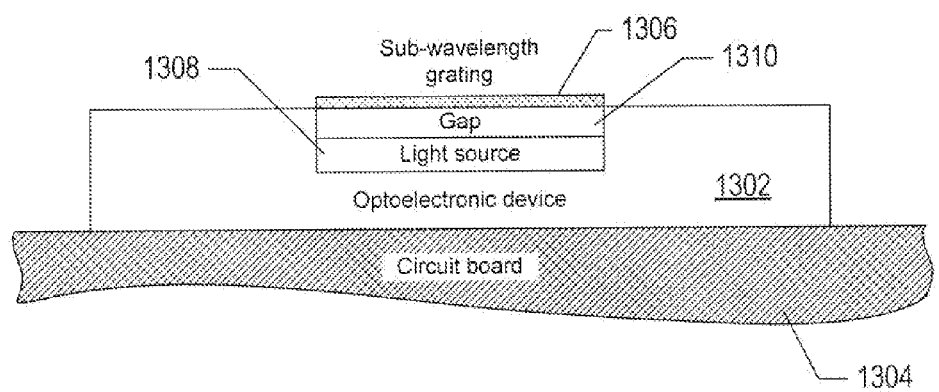

The optical elements described above may be integrated in optoelectronic devices to direct or focus the light output from photonic devices. FIG. 13A shows an isometric view of an example optoelectronic device 1302 connected to a circuit board 1304. The device 1302 includes an optical element of which the SWG 1306 is shown. The optical element is embedded within the top surface of the device 1302. FIG. 13B shows a cross-sectional view of the optoelectronic device 1302 along a line D-D, shown in FIG. 13A. FIG. 13B reveals that the optoelectronic device 1302 includes a light source 1308 located beneath and separated by a gap 1310 from the SWG 1306 of the optical element. Light source 1308 can be vertical-cavity surface emitting laser ("VCSEL") and may include a modulator. The VCSEL can be directly modulated or the modulator can be used to modulate the light output from the VCSEL to produce an optical signal transmitted through the SWG 1306.

Figure 14:
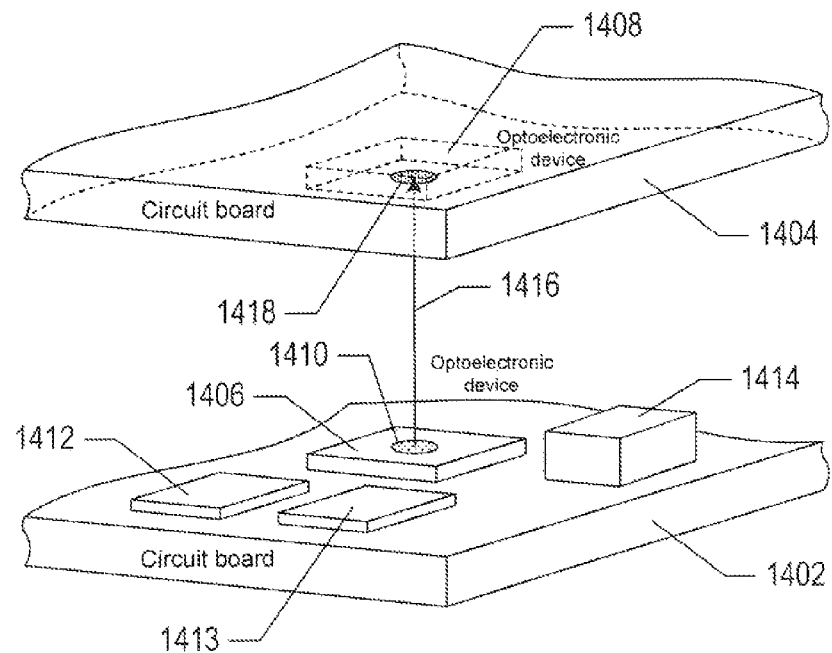
FIG. 14 shows an isometric view of an example first circuit board and an example second circuit board.

An SWG integrated with a first optoelectronic device can be configured to direct optical signals in free-space to a photodiode integrated with a second optoelectronic device connected to a second circuit board that is located above the first circuit board. FIG. 14 shows an isometric view of an example first circuit board 1402 and an example second circuit board 1404. An optoelectronic transmitter device 1406 is electronically connected to the first circuit board 1402 and an optoelectronic receiver device 1408 is electronically connected to the second circuit board 1404. The transmitter device 1406 includes an optical element 1410 and receives electronic signals from processors, memory, sensors or other electronic devices 1412-1414 electronically connected to the board 1402. Alternatively, the transmitter device 1406 can be a multicore processor, memory, or a sensor integrated with the channel sources in a single device. The transmitter device 1406 converts electronic signals into optical signals 1416 that are transmitted through the SWG of the optical element 1410. As shown in the example of FIG. 14, the SWG of the optical element 1410 is configured to operate as a focusing spherical lens, such as optical element 700, to focus the optical signals onto a photodetector 1418 located above the optical element 1410. The photodetector 1418 is integrated with the device 1408 and converts the optical signals into electronic signals that can be processed by the device 1408 or sent by the device 1408 to other electronic devices connected to the circuit board 1404.

Figure 15:
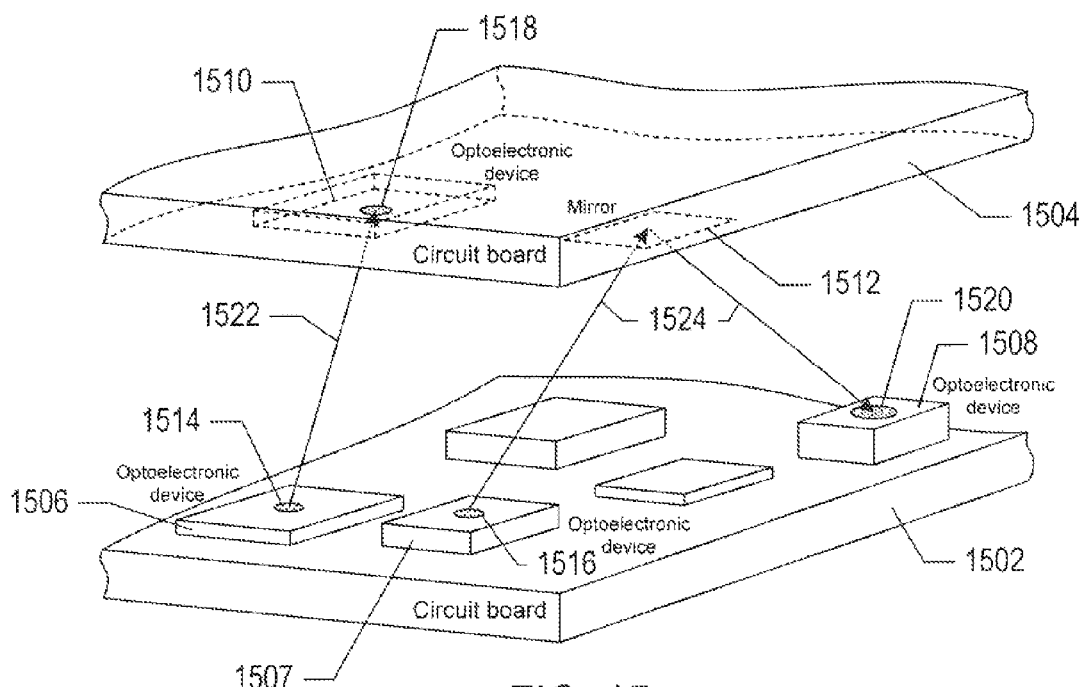
FIG. 15 shows an isometric view of an example first circuit board and an example second circuit board.

FIG. 15 shows an isometric view of an example first circuit board 1502 and an example second circuit board 1504. The circuit board 1502 includes two optoelectronic transmitter devices 1506 and 1507 and an optoelectronic receiver device 1508, and the circuit board 1504 includes an optoelectronic receiver device 1510 and a mirror 1512 positioned to face to the circuit board 1502. The transmitter devices 1506 and 1507 include optical elements 1514 and 1516, respectively, and the receiver devices 1508 and 1510 include photodetectors 1518 and 1520. The transmitter device 1506 converts electronic signals into optical signals 1522 that are transmitted through the SWG of the optical element 1514. As shown in the example of FIG. 15, the SWG of the optical element 1514 is configured to operate in the same manner as the optical element 400 to direct the optical signals onto the photodetector 1518, which converts the optical signals into electronic signals that can be processed by the device 1510 or sent by the device 1510 to other electronic devices connected to the circuit board 1504. The transmitter device 1507 also converts electronic signals into optical signals 1524 that are transmitted through the SWG of the optical element 1514. The SWG of the optical element 1516 is also configured to operate in the same manner as the optical element 400 to direct the optical signals to reflect off of the mirror 1512 and onto the photodetector 1520 of the device 1508. The photodetector 1520 converts the optical signals into electronic signals that can be processed by the device 1508 or sent by the device 1508 to other electronic devices connected to the circuit board 1502. In other words, the optical element 1516 in combination with the mirror 1512 appropriately position above the optical element 1516 can be used to send optical signals from the device 1507 to device 1508, both of which are connected to the same circuit board 1502.

Figure 16A:
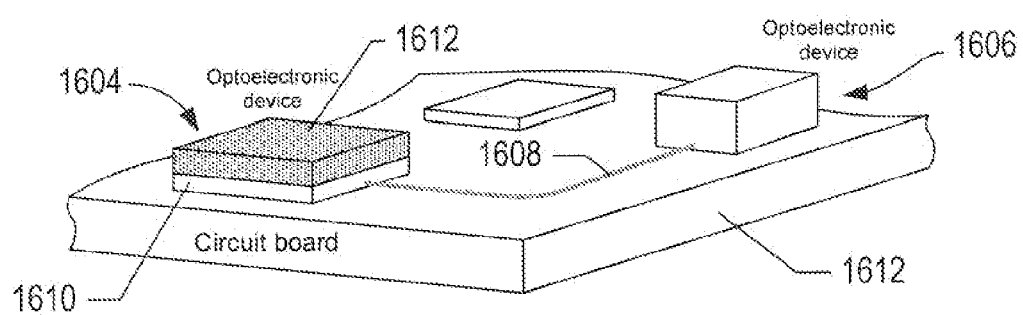
FIG. 16A shows an isometric view of an example circuit board.

FIG. 16A shows an isometric view of an example circuit board 1602. Optoelectronic devices 1604 and 1606 are attached to the board 1602 and are in optical communication via a waveguide 1608 disposed on the board 1602. The devices 1604 and 1606 can be processors, memory, or sensors. In the example shown in FIG. 16A, the device 1606 generates optical signals that are sent over the waveguide 1608 to the device 1604. The device 1604 includes an optical interconnect layer 1610 and a CMOS package 1612 disposed on the interconnect layer 1610.

Figure 16B:
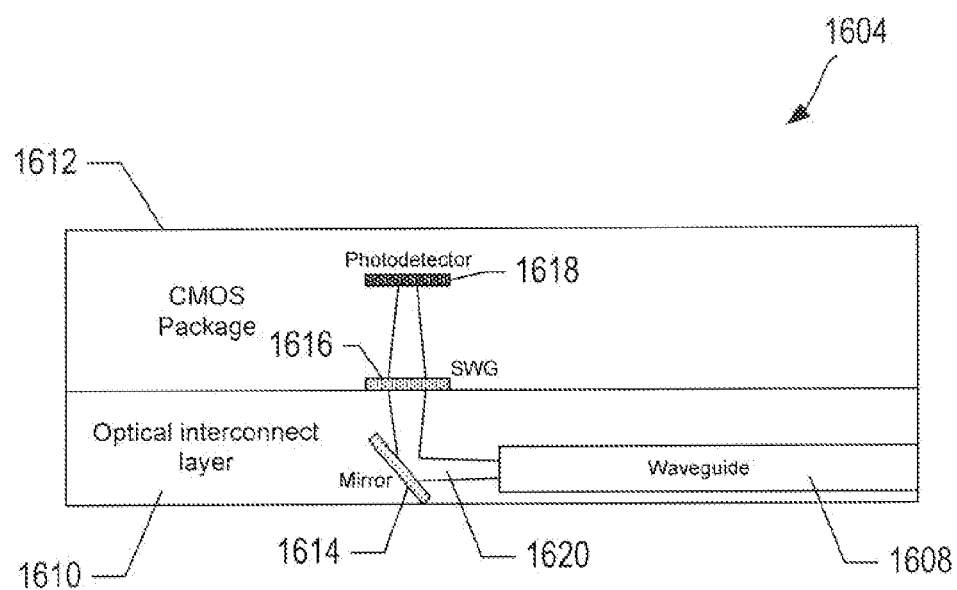
FIG. 16B shows a cross-sectional view of the optoelectronic device shown in FIG. 16B.

FIG. 16B shows a cross-sectional view of the device 1604. The interconnect layer 1610 includes a portion of the waveguide 1608 and a mirror 1614. The device 1604 includes an SWG 1616 positioned between the CMOS package 1612 and the interconnect layer 1610 to focus light reflected from the mirror 1614 onto the photodetector 1618. For example, as shown in FIG. 16B, an optical signal represented by a beam of light 1620 output from the end of the waveguide 1608 is reflected by the mirror 1614 toward the SWG 1616. The SWG 1616 can be configured to operate as a spherical lens or a cylindrical lens to focus the beam of light onto the photodetector 1618.

An optical element can also be implemented in a waveguide coupler to focus light into the core of an optical fiber. FIGS. 17A-17B show isometric and side views of an example waveguide coupler 1700. The coupler 1700 includes an adiabatic tapered region 1702 located at the end of a waveguide 1704 and a SWG 1706 disposed on a substrate region 1708. The SWG 1706 can be configured to deflect light at a particular angle, as described above with reference to SWG 400, or operate as a spherical lens or a cylindrical lens, as described above with reference to SWGs 700 and 1100. As shown in FIG. 17A, the adiabatic taper 1702 enables light to spread out as the light enters the region 1708 and is emitted out of the xy-plane of the SWG 1706. As shown in FIG. 17B, the light output through the SWG 1706 is focused into a core 1710 of an optical fiber 1712. Light output from the core 1710 of the fiber 1712 can also be captured by the SWG 1706 and directed into the region 1708.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the following claims and their equivalents.

What is claimed is:

1. An optical element comprising:
a substrate having a planar surface; and
a polarization insensitive, high contrast, sub-wavelength grating composed of posts that extend from the planar surface, the grating having at least one region wherein cross-sectional dimensions of the posts or lattice arrangement of the posts are nonperiodically and systematically varied along a direction parallel to the planar surface to control refraction of light transmitted through the optical element, such that a given post does not have a neighboring post with a same cross-sectional dimension as the given post along more than one line,
wherein the grating further comprises a thickness that satisfies a condition $$t < \frac{\lambda}{(n_{SWG} - n_s)}$$

where t is the thickness of the grating, λ is the wavelength of the light, and $n_{SWG}$ is the effective refractive index of the grating at the wavelength λ.

2. The element of claim 1, wherein the lattice arrangement of the posts further comprises the posts having at least one two-dimensional regular geometrical lattice arrangement.

3. The element of claim 1, wherein within each region the cross-sectional dimensions of the posts are nonperiodically varied further comprises within each region the cross-sectional dimensions of the posts nonperiodically and systematically varied in a first direction parallel to the planar surface and the cross-sectional dimensions of the posts are constant in a second direction parallel to the planar surface, the second direction perpendicular to the first direction.

4. The element of claim 1, wherein within each region the cross-sectional dimensions of the posts are nonperiodically varied further comprises within each region the cross-sectional dimensions of the posts nonperiodically and systematically varied away from the center of the grating.

5. The element of claim 1, wherein within each region cross-sectional dimensions of the posts are nonperiodically varied further comprises nonperiodic and systematic variation in the cross-sectional dimensions of the posts repeats for each of the at least one regions.

6. The element of claim 1, further comprising the posts have a cross-sectional shape selected from circular, elliptical, square, rectangular, triangular, or irregular.

7. The element of claim 1, wherein the posts are nonperiodically varied further comprises the posts are nonperiodic and systematically varied within each region to focus transmitted light.

8. The element of claim 1, wherein the posts are nonperiodically varied further comprises the posts are nonperiodic and systematically varied within each region to deflect transmitted light with a non-zero angle of transmission.

9. A waveguide coupler comprising:
a substrate including a planar region and an adiabatic tapered region connected to a waveguide; and
a polarization insensitive, high contrast, sub-wavelength grating disposed on the planar region and configured in accordance with claim 1.

10. An optoelectronic device comprising:
a CMOS package including a photodetector;
an optical interconnect layer including a waveguide to receive light;
a substrate having a planar surface; and
a polarization insensitive, high contrast, sub-wavelength grating composed of posts that extend from the planar surface, the grating having at least one region wherein cross-sectional dimensions of the posts and/or lattice arrangement of the posts are nonperiodically varied to control refraction of light transmitted through the sub-wavelength grating, wherein the polarization insensitive, high contrast, sub-wavelength grating is disposed between the CMOS package and the optical interconnect layer.

11. An optoelectronic device comprising:
a light source; and
an optical element separated from the light source by a gap, wherein the optical element includes a polarization insensitive sub-wavelength grating composed of posts that extend from a planar surface of a substrate, the grating having at least one region wherein cross-sectional dimensions of the posts or lattice arrangement of the posts are nonperiodically and systematically varied along a direction parallel to the planar surface to control refraction of the light emitted from the light source, such that a given post does not have a neighboring post with a same cross-sectional dimension as the given post along more than one line, wherein the grating further comprises a thickness that satisfies a condition $$t < \frac{\lambda}{(n_{SWG} - n_s)}$$

where t is the thickness of the grating, λ is the wavelength of the light, and $n_{SWG}$ is the effective refractive index of the grating at the wavelength λ.

12. The device of claim 11, wherein within each region the cross-sectional dimensions of the posts are nonperiodically varied further comprises within each region the cross-sectional dimensions of the posts nonperiodically and systematically varied in a first direction parallel to the planar surface and the cross-sectional dimensions of the posts are constant in a second direction parallel to the planar surface, the second direction perpendicular to the first direction.

13. The device of claim 11, wherein within each region the cross-sectional dimensions of the posts are nonperiodically varied further comprises within each region the cross-sectional dimensions of the posts nonperiodically and systematically varied away from the center of the grating.

14. The device of claim 11, wherein within each region cross-sectional dimensions of the posts are varied further comprises nonperiodic and systematic variation in the cross-sectional dimensions of the posts repeats for each of the at least one regions.

* * * * *